Patented July 27, 1948

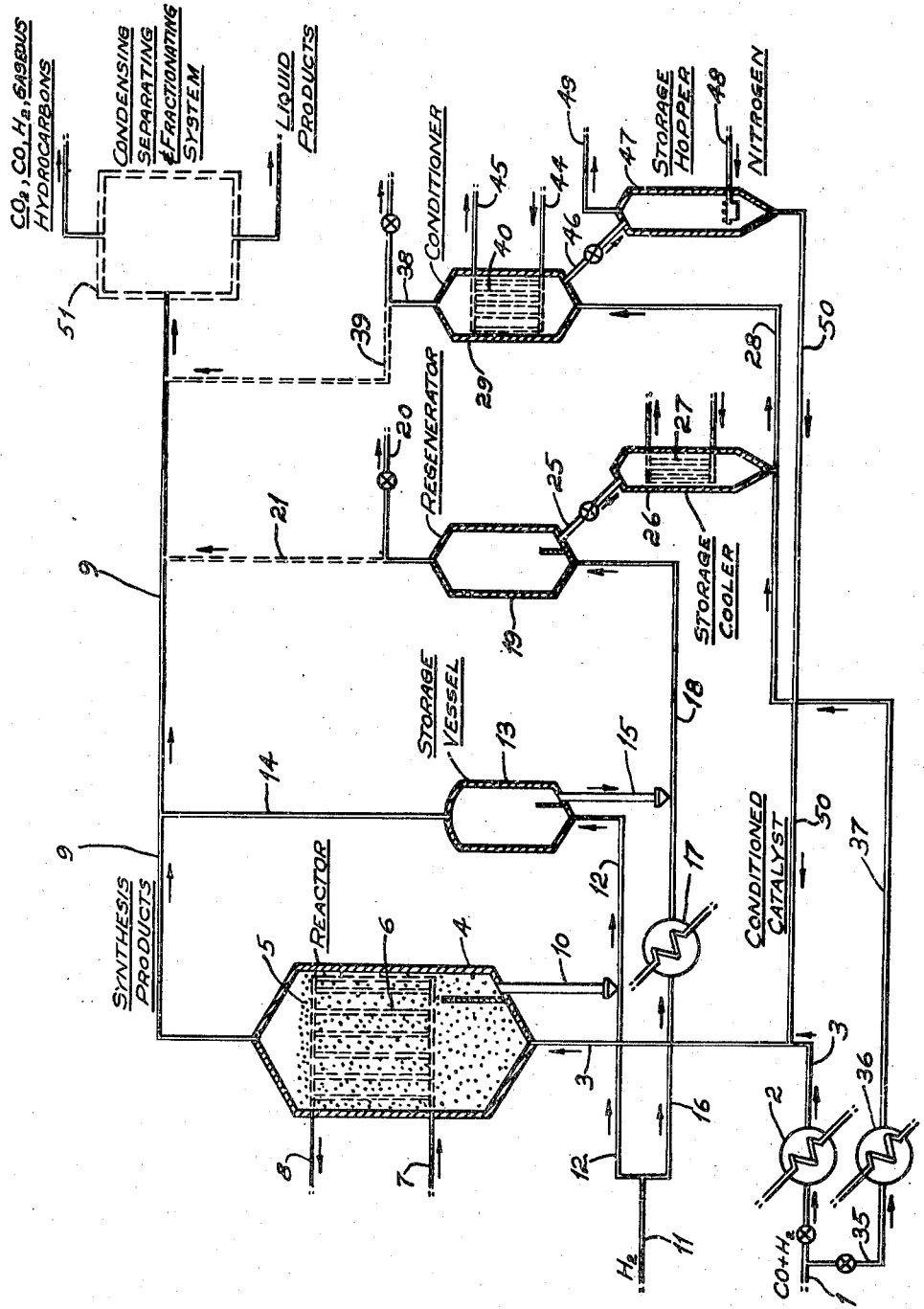

2,445,796

UNITED STATES PATENT OFFICE 2,445,796

PROCESS FOR THE CATALYTIC HYDROGENATION OF CARBON OXIDES

Alfred J. Millendorf, Beacon, N. Y., assignor to The Texas Company, New York, N. Y., a corporation of Delaware Application February 26, 1946, Serial No. 650,313

9 Claims. (Cl. 260—449.6)

This invention relates to the hydrogenation of carbon oxides and particularly to the hydrogenation of carbon monoxide to form hydrocarbons, oxygenated hydrocarbons and the like by contact with a hydrogenation catalyst in solid particle form.

The invention contemplates reacting carbon monoxide and hydrogen by passage in gaseous form in contact with a fluidized powdered synthesis catalyst such as a catalyst comprising a metal or metals of the iron group at a temperature within a predetermined reaction temperature range. During continued use the powdered catalyst becomes contaminated with solidifiable reaction products. Resulting contaminated catalyst powder is drawn off from the reaction zone, treated so as to effect removal of the solidifiable material, reactivated and then conditioned by contact with synthesis gas at temperatures substantially below the aforesaid predetermined reaction temperature range.

In my co-pending application S. N. 570,223, filed December 28, 1944, for Hydrogenation of carbon oxides, I have disclosed removing the solidifiable or waxy material deposited upon the catalyst either by solvent extraction or by treatment with hydrogen at elevated temperatures, in situ.

In accordance with the present invention, the synthesis is effected by contact with powdered or finely divided catalyst in a fluidized state. Provision is made for removing a portion of used catalyst continuously or intermittently from the synthesis reaction zone and without necessarily discontinuing the operation of the synthesis reactor. The removed portion of catalyst powder is treated to remove solidifiable constituents and effect reduction of catalyst metal and then separately treated with cool synthesis gas or a gas rich in carbon monoxide at temperatures substantially below the desired synthesis temperatures so as to effect substantial conversion of the catalyst metal to the carbide form. The resulting carbided catalyst is thereafter returned to the synthesis reactor, preferably while at reduced temperature. Preferably the removal of the solidifiable material is effected by treatment with hydrogen at elevated temperature under reducing conditions. Thereafter the catalyst temperature is reduced to a temperature in the range of about 200 to 250° F. Synthesis gas, initially at relatively low temperature, is thereafter passed in contact with the catalyst under conditions so as to raise the catalyst temperature slowly to substantially the reaction temperature range; for example, the temperature of the catalyst is raised at the rate of about 2 to 30° F. per hour over a period of at least several hours.

The regeneration of a synthesis catalyst by the use of hydrogen at elevated temperatures, that is, in the range of about 350 to 800° F. removes active carbide layers or centres as well as the solidifiable or waxy material deposited upon the catalyst. Restoration of these active carbide layers is essential for the direction of the hydrogenation of carbon monoxide towards the synthesis of desired hydrocarbons and oxygenated hydrocarbons. The conditioning of the catalyst after regeneration in accord with the method of this reaction results in restoration of these essential intermediate carbide layers at a reduced temperature which is favorable for the formation of metallic carbides.

The reaction by which the metallic carbide layers are formed is a highly exothermic one and is illustrated as follows for the formation of iron carbide:

$$3Fe + CO + H_2 \rightarrow Fe_3C + H_2O$$
$$3Fe + 2CO \rightarrow Fe_3C + CO_2$$

At about 350° F., the formation of iron carbide—which is in the alpha form at this temperature—by the first of the two reactions illustrated above is exothermic to the extent of about 26,300 calories, which formation of iron carbide by the second reaction illustrated above is exothermic to the extent of about 35,400 calories at 350° F.

Since the carbide-forming reaction is exothermic, the employment of reduced temperatures for the formation of the carbide is advantageous. From the standpoint of reducing the total quantity of heat liberated in the synthesis reactor, it is advantageous to effect carbiding of the catalyst metal in a separate or conditioning zone.

The invention has particular application to a fluidized powdered catalyst operation carried out at temperatures such that solidifiable or waxy products of reaction solidify within the pores and upon the surfaces of the catalyst particles. The deposition of waxy material upon the catalyst particles results in the formation of aggregates or lumps of catalyst, and these resulting aggregates or lumps settle to the lower portion or to the bottom of the fluidized catalyst reactor. Thus, the so-contaminated catalyst fails to remain uniformly fluidized within the reactor and also ceases to be effective as a catalyst.

The hydrogenation of carbon monoxide to produce hydrocarbons and the like is highly exothermic and in order to control the temperature within the reaction zone, it is necessary to provide means for removing this exothermic heat of reaction. This is advantageously accomplished by providing heat exchange surfaces within the fluidized reactor adapted to bring about indirect heat exchange between the fluidized catalyst and a suitable heat carrier medium. Consequently, it is essential to maintain even fluidization of the catalyst powder throughout the reaction zone through which the heat exchange surfaces extend. It has been found that when fluidization of the catalyst powder in a dense phase is maintained along the entire heat exchange surface, a relatively high rate of heat exchange is secured. Therefore, an important advantage of the present invention resides in maintaining the catalyst powder in a condition which favors realizing uniform fluidization throughout the reaction zone during continued use of the catalyst.

Deposition of waxy products of reaction upon the catalyst is more pronounced when the synthesis reaction is carried out at temperatures in the range below about 550° F., and therefore the present invention is particularly applicable as a means for facilitating the employment of the fluidized powdered catalyst technique for the synthesis of hydrocarbons and the like from carbon monoxide and hydrogen at temperatures in the range below about 550° F. However, wax deposition takes place even above 550° F., and the invention is applicable when the synthesis reaction is carried out at higher temperatures.

The invention will now be described with reference to the flow diagram illustrated in the accompanying drawing. As there indicated, a stream of carbon monoxide and hydrogen comprising about 1 volume of carbon monoxide to 2 volumes of hydrogen is drawn from a source not shown through a pipe 1 which leads into a heater 2 wherein the synthesis gas mixture is heated prior to its contact with synthesis catalyst. The gas is introduced to the lower portion of a reactor 4 through a pipe 3.

The temperature to which the synthesis gas is preheated depends upon the catalyst which is used. Thus, the carbon monoxide and hydrogen may be heated to a temperature of about 325 to 375° F. prior to introduction to the reactor when using a cobalt catalyst.

A mass of powdered catalyst 5 is maintained within the reactor. This catalyst may be a cobalt-magnesia-thoria catalyst having a composition of approximately 32% cobalt, 64% filter cel and 4% thorium and magnesium oxides. It is in the form of a powder which may have a mesh in the range of about 100 to 400.

The synthesis gas is caused to rise through the catalyst powder at a velocity sufficient to maintain the catalyst in a state of dense phase fluidization without substantial entrainment of the catalyst particles in the effluent vapor stream from the reactor.

The reaction temperature within the reactor is advantageously maintained within the range about 365 to 450° F. Under these conditions, the carbon monoxide and hydrogen react to form primarily normally liquid hydrocarbons.

As indicated, a tubular heat exchanger element 6 is positioned within the reactor. A heat carrier liquid is introduced from a source not shown through a pipe 7 to the coil 6 and discharged therefrom through a pipe 8. The heat carrier liquid may be water, oil or some other organic compound such as diphenyl. The exchanger 6 may serve as a steam generator. At any rate, the heat carrier liquid is caused to circulate through the exchanger so as to remove the exothermic heat in sufficient amount to maintain the reaction temperature within the predetermined limits desired.

Unreacted synthesis gas and the resulting synthesis products comprising carbon dioxide, water, gaseous hydrocarbons and normally liquid hydrocarbons, including gasoline hydrocarbons and higher boiling hydrocarbons, are continuously removed from the reactor through a pipe 9 and passed to a suitable condensing, separating and fractionating system wherein separation is effected between gaseous components, water and hydrocarbons, etc.

A small portion of the total catalyst confined within the reactor 4 is continuously drawn off from the bottom thereof through a standpipe 10. This withdrawn catalyst comprises catalyst particles which have become contaminated with waxy products of reaction. The catalyst may be conducted by a mechanical conveyor or by jetting with gas through a conduit to a storage vessel 13.

Hydrogen is obtained from a source not shown through a pipe 11 and is divided into a major and minor stream. The minor stream passes along a pipe 12 which the used catalyst enters from the synthesis reactor 4 through the standpipe 10. The used catalyst is carried along the pipe 12 by a relatively cool hydrogen gas stream and is introduced into a vessel 13.

In the vessel 13, the catalyst is first freed of adsorbed synthesis gas by purging with hydrogen at relatively low temperature so as to avoid carbonaceous deposits being formed on the catalyst during the subsequent regeneration with hydrogen. The effluent from this purging treatment, which comprises mainly hydrogen and minor quantities of carbon monoxide, leaves the vessel 13 through a pipe 14 and is introduced into the pipe 9 through which the effluent from the synthesis reactor flows. The effluent from the vessel 13 may be used to enrich the hydrogen content of the recycle gas which is separated from the effluent of the reactor 4.

After the used catalyst is purged of residual synthesis gas in the vessel 13, which may be ascertained by the absence of carbon monoxide in the effluent therefrom, catalyst is withdrawn from the vessel 13 through a standpipe 15 which flows into a conduit 16.

The major portion of the hydrogen stream which is obtained through the pipe 11 passes along a pipe 16 into a heater 17 in which it is raised to an elevated temperature, preferably in the range of 600 to 800° F. The hydrogen at an elevated temperature leaves the heater 17 through conduit 18. The hydrogen stream is used to convey the purged catalyst along the conduit 18 into a regenerator 19. The regenerator 19 may comprise a tower through which the contaminated catalyst flows countercurrently to a rising stream or body of hydrogen gas. If desired, the regenerator may be in the form of a closed vessel provided with an agitating mechanism adapted to propel the contaminated catalyst through the vessel and effect intimate contact between it and the hydrogen gas. The regenerator 19 may also be of the "fluid" type as illustrated wherein the hydrogen gas is passed through the regenerator at a velocity sufficient to maintain the catalyst, during regeneration, in a fluidized state without substantial entrainment of the catalyst particles in the effluent gaseous stream from the regenerator 19.

The treatment with hydrogen gas is carried out at a temperature of about 450 to 800° F. and under conditions such as to convert the adhering waxy material into gaseous and liquid products which leave the regenerator 19 together with excess hydrogen through a pipe 20. Advantageously the effluent from the regenerator 19 is diverted from the pipe 20 through a pipe 21 and is introduced into the pipe 9 which leads to the condensing, separating and fractionating system in which the effluent from the synthesis reactor 4 is treated. Therein the products formed by the hydrogen dewaxing in the regenerator 19 may also be further processed. The excess hydrogen in the effluent may thereafter be used to increase the proportion of hydrogen in the synthesis gas passing to the reactor 4.

The hydrogen-treated catalyst from which the waxy material has been removed is conducted through a conduit 25 to a storage cooler 26 wherein the temperature is permitted to fall to about 200 to 250° F. The storage hopper 26 contains cooling means 27 whereby the temperature of the catalyst is reduced after its regeneration. From there it is conducted through a conduit 28 to a conditioning reactor 29.

A stream of carbon monoxide and hydrogen is conducted from the pipe 1 through a pipe 35 to a heater 36 wherein it is initially heated to a temperature in the range of about 200 to 300° F. The heated synthesis gas stream leaves the heater 36 through a pipe 37 and is then used to convey the catalyst from the storage cooler 26 through the pipe 28 to the conditioner 29. The synthesis gas and the cooled catalyst are introduced into the lower portion of the conditioner through the pipe 28. Advantageously, the density of the synthesis gas and the velocity at which it is passed through the conditioning reactor 29 is correlated with the particle size and density of the catalyst contained therein so as to maintain the catalyst in a fluidized state without substantial entrainment of the catalyst particles in the effluent stream leaving the conditioner 29. Thus, the conditioner 29 may resemble the synthesis reactor 4 on a small scale. However, the synthesis gas may be passed through the mass of catalyst powder at such a low velocity that no fluidization takes place.

Thus, the gas stream may be passed through the catalyst powder at a space velocity ranging from about 10 to 1,000 cubic feet of gas, measured at standard conditions, per cubic foot of catalyst per hour.

The temperature of the entering stream of carbon monoxide and hydrogen is gradually increased to a temperature of about 385° F. or to a temperature approximating that prevailing within the synthesis reactor 4. The aforementioned increase in temperature is effected uniformly over a period of time ranging from about 6 to 72 hours. The rate of temperature increase may be expressed as being in the range of about 2 to 30° F. per hour.

The conditioning treatment in this fashion results in reformation of essential carbide layers at reduced temperatures which are favorable for carbide formation. Moreover, reconditioning in this manner makes it possible to attain optimum yields in the hydrogenation of carbon monoxide at a minimum temperature.

During the conditioning treatment, a small amount of the synthesis gas may be converted into synthesis products such as hydrocarbons and oxygenated hydrocarbons with evolution of heat. A heat exchanger element 40 is positioned within the conditioner 29 to remove this heat and maintain the desired temperature. A heat carrier liquid enters the heat exchanger element 40 through a pipe 44 and issues therefrom through a pipe 45.

The catalyst, after this conditioning treatment, is conducted to a storage hopper 47 through a conduit 46. In the storage hopper 47, the regenerated and reconditioned catalyst is advantageously blanketed and cooled with nitrogen which enters the hopper 47 through a pipe 48 and which displaces the synthesis gas contained therein through a pipe 49. From the storage hopper 47, the catalyst is returned through a conduit 50 and the pipe 3 to the reactor 4. It is possible to return the conditioned catalyst directly from the conditioner to the reactor 4.

The return of cooled reactivated catalyst which has been regenerated and reconditioned into the lower portion of the reactor 4 provides an additional cooling feature. The greatest need for cooling exists in the bottom portion of the reactor 4 wherein the greatest percentage of conversion of synthesis gas takes place. The recharging of cooled reactivated catalyst containing metallic carbide continuously or intermittently to the lower portion of the reactor 4, together with the fresh stream of synthesis gas, supplies additional cooling where it is most needed.

The products resulting from the conditioning treatment are either discharged through a pipe 38 or they are conducted all or in part through a pipe 39 to the pipe 9 which leads to the aforesaid condensing, separating and fractionating system.

The numeral 51 indicates the condensing, separating and fractionating system to which the products from the synthesis reaction and from the conditioning reactor 29 may be passed, as well as the products from the hydrogen treatment in the regenerator 19. However, it is contemplated that these streams may be separately treated.

The conditioning of the hydrogen-treated catalyst in the conditioning reactor 29 results in a substantial increase in the activity and active life of the catalyst. For example, when a used cobalt catalyst is regenerated in the conventional manner without the previously-described conditioning step, the hydrocarbon yield obtained on reuse of the catalyst at a reaction temperature of about 374° F. is of the order of about 0.71 gallon per thousand cubic feet of synthesis gas. On the other hand, when a used cobalt catalyst is treated in the manner contemplated by the present invention, the hydrocarbon yield obtained on reuse of the catalyst under similar reaction conditions may be as high as one gallon per thousand cubic feet.

The conditioned catalyst from storage hopper 47 may be returned to the reactor 4 by the jet action of the stream of synthesis gas passing into the reactor 4 since the catalyst is well below reaction temperature.

The synthesis reaction may be employed for the production of oxygenated compounds rather than hydrocarbons. Also, the synthesis reaction as well as the regeneration and conditioning treatments may be carried out under pressures ranging from atmospheric to several hundred pounds or more.

While a cobalt type of catalyst has been specifically mentioned, it is contemplated that iron or nickel or a combination thereof may be used instead of or in conjunction with cobalt. Materials such as alumina, fuller's earth or silica gel may be used in place of Filter Cel and other promoters may be used in place of thorium and magnesium oxides, as for example, the oxides of uranium and vanadium. The catalyst may also comprise powdered iron with or without a support.

The proportion of carbon monoxide to hydrogen used in the procedure set forth may vary as desired, depending upon the type of product desired from the synthesis reaction. Usually the composition of the carbon monoxide and hydrogen mixture used during the catalyst conditioning step will correspond substantially to that prevailing during the synthesis reaction.

The reduction in temperature of the catalyst mass prior to the conditioning step may be partially effected in the regenerator 19 by lowering the temperature of the entering stream of hydrogen after the effluent stream from the regenerator 19 is free from hydrocarbons. The temperature to which the catalyst should be reduced before it is conditioned depends upon the nature of the catalyst. The temperature should be about 50 to 75° F. below that at which the catalyst becomes active. For a cobalt catalyst the temperature should be reduced below about 260-300° F., and for an iron catalyst below about 350-400° F.

In the conditioner 29, the temperature should be raised uniformly preferably at about 9 to 12° F. per hour to a temperature which is substantially equivalent to that which is employed in the synthesis step. The maximum temperature to which the catalyst is raised in the conditioner 29 approximates the temperature at which it is contemplated to conduct the synthesis reaction.

Obviously many modifications and variations of the invention, as hereinbefore set forth, may be made without departing from the spirit and scope thereof and, therefore, only such limitations should be imposed as are indicated in the appended claims.

I claim:

1. In the catalytic hydrogenation of carbon monoxide for the production of hydrocarbons, oxygenated compounds and the like, the method which comprises continuously passing carbon monoxide and hydrogen in contact with a fluidized powdered synthesis catalyst within a reaction zone, effecting said contact at a temperature within a predetermined range such that substantial conversion of carbon monoxide into higher molecular weight compounds occurs with some deposition of solidifiable material upon the catalyst particles, continuously withdrawing from the reaction zone catalyst contaminated with said solidifiable material, subjecting withdrawn catalyst to contact with hydrogen under regenerating conditions including an elevated temperature effective to strip the said solidifiable material from the catalyst, reducing the temperature of resulting hydrogen treated catalyst to substantially below said predetermined temperature range, thereafter passing a mixture of carbon monoxide and hydrogen in contact with resulting cooled catalyst while slowly raising the temperature of the catalyst to substantially said predetermined range to thereby condition the catalyst, and thereafter recycling resulting conditioned catalyst to said reaction zone.

2. The method according to claim 1 in which the temperature of the catalyst is raised at the rate of about 2 to 30° F. per hour during said conditioning.

3. The method according to claim 1 in which the temperature is slowly raised from about 200° F. to substantially said predetermined temperature range during said conditioning.

4. The method according to claim 1 in which the hydrogenation catalyst is a cobalt-magnesia-thoria catalyst.

5. In the catalytic hydrogenation of carbon monoxide for the production of hydrocarbons, oxygenated compounds and the like, the method which comprises continuously passing carbon monoxide and hydrogen in contact with a fluidized powdered synthesis catalyst within a reaction zone, effecting said contact at a temperature within a predetermined range such that substantial conversion of carbon monoxide into higher molecular weight compounds occurs with some deposition of solidifiable material upon the catalyst particles, continuously withdrawing from the reaction zone catalyst contaminated with said solidifiable material, subjecting withdrawn catalyst to contact with hydrogen at substantially said predetermined temperature range to effect activation and removal of waxy material, reducing the temperature of resulting hydrogen treated catalyst to substantially below said predetermined temperature range, thereafter passing a mixture of carbon monoxide and hydrogen in contact with resulting cooled catalyst while slowly raising the temperature of the catalyst to substantially said predetermined range to thereby condition the catalyst, and thereafter recycling resulting conditioned catalyst to said reaction zone.

6. The method according to claim 5 in which the temperature is raised at the rate of about 2 to 30° F. per hour during conditioning of the catalyst.

7. The method defined in claim 5 in which said hydrogen treated catalyst is reduced to at least about 50° F. below that temperature at which the catalyst becomes active.

8. In the catalytic hydrogenation of carbon monoxide for the production of hydrocarbons, oxygenated hydrocarbons and the like, wherein carbon monoxide and hydrogen are continuously passed in contact with a fluidized, powdered synthesis catalyst comprising iron within a reaction zone at a temperature within a predetermined operating range such that substantial conversion of carbon monoxide into higher molecular weight compounds occurs, with some deposition of solidifiable material upon the catalyst particles, and wherein so contaminated catalyst is continuously withdrawn from the reaction zone and subjected to contact with hydrogen at an elevated temperature range operative to effect stripping of said solidifiable material from the surface thereof, and thereafter returned to said reaction zone, the improvement which comprises conditioning said catalyst after said hydrogen treatment and prior to its return to the reaction zone by passing a mixture of carbon monoxide and hydrogen in contact with the catalyst at a temperature in the range below about 400° F., raising the temperature about 2 to 30° F. per hour to substantially said predetermined range of operation, and recycling resulting conditioned catalyst to said reaction zone.

9. In the catalytic hydrogenation of carbon monoxide for the production of hydrocarbons, oxygenated hydrocarbons and the like, wherein carbon monoxide and hydrogen are continuously passed in contact with a fluidized powdered synthesis catalyst comprising cobalt within a reaction zone at a temperature within a predetermined operating range such that substantial conversion of carbon monoxide into higher molecular weight compounds occurs, with some deposition of solidifiable material upon the catalyst particles, and wherein so contaminated catalyst is continuously withdrawn from the reaction zone and subjected to contact with hydrogen at an elevated temperature range operative to effect stripping of said solidifiable material from the surface thereof, and thereafter returned to said reaction zone, the improvement which comprises conditioning said catalyst after said hydrogen treatment and prior to its return to the reaction zone by passing a mixture of carbon monoxide and hydrogen in contact with the catalyst at a temperature in the range below about 300° F., raising the temperature about 2 to 30° F. per hour to substantially said predetermined range of operation, and recycling resulting conditioned catalyst to said reaction zone.

ALFRED J. MILLENDORF.

REFERENCES CITED

The following references are of record in the file of this patent:

UNITED STATES PATENTS

| Number    | Name      | Date          |
|-----------|-----------|---------------|
| 2,159,140 | Eckell    | May 23, 1939  |
| 2,255,126 | Myddleton | Sept. 9, 1941 |
| 2,360,787 | Murphree  | Oct. 17, 1944 |

FOREIGN PATENTS

| Number  | Country       | Date          |
|---------|---------------|---------------|
| 471,595 | Great Britain | Sept. 7, 1937 |
| 557,904 | Great Britain | Dec. 10, 1943 |